United States Patent [19]
Desautels et al.

[11] Patent Number: 5,571,059
[45] Date of Patent: Nov. 5, 1996

[54] OPERATOR INPUT SYSTEM FOR GEAR SHIFT ASSIST MECHANISM

[75] Inventors: Thomas Desautels, West Bloomfield, Mich.; Jon M. Huber, Laurinburg, N.C.; Edward M. Bacon, Northville; Steve M. Weisman, Farmington Hills, both of Mich.

[73] Assignee: Rockwell International Corporation, Pittsburgh, Pa.

[21] Appl. No.: 508,307

[22] Filed: Jul. 27, 1995

[51] Int. Cl.$^6$ ................................................. B60K 41/08
[52] U.S. Cl. ............................................................ 477/111
[58] Field of Search ................................... 477/109, 111

[56] References Cited

U.S. PATENT DOCUMENTS

| 4,593,580 | 6/1986 | Schulze | 477/110 |
| 5,172,603 | 12/1992 | MacInnis | 74/335 |
| 5,487,004 | 1/1996 | Amsallen | 477/109 |

FOREIGN PATENT DOCUMENTS 9102912  3/1991  WIPO .

*Primary Examiner*—Dirk Wright

[57] ABSTRACT

An operator input control system for a system to assist shifting in a multi-speed transmission includes a switch that allows an operator to provide an indication of the direction of the next shift. The operator is also provided with a switch that allows a request for torque elimination to move the transmission to neutral without clutching. In one embodiment, the operator is able to provide the shift indication separately from requesting torque elimination. In a second embodiment, a single three position switch is utilized to provide both the request for torque elimination and the shift indication. The system is operable to initially eliminate or reduce the torque load between the engine and the transmission such that the operator is able to move the transmission to neutral without clutching. The system then begins to move the engine output speed to a speed that is synchronized with the value necessary at the next gear to achieve a relatively smooth speed shift.

20 Claims, 2 Drawing Sheets

OPERATOR INPUT SYSTEM FOR GEAR SHIFT ASSIST MECHANISM

BACKGROUND OF THE INVENTION

This invention relates to a system allowing an operator to input control signals to an engine control for assisting the shifting of a transmission between several speeds.

Heavy vehicles are typically driven with a multi-speed transmission transmitting drive from an engine to the axles for the vehicle. The transmission is movable through several speeds at the control of a manual stick shift.

In a typical transmission, a number of gears inter-engage to provide the several speeds. In a typical manual transmission, toothed shift collars slide to engage selected gears with an output shaft. To complete a shift, the operator must first move the gear that is presently engaged out of engagement to a "neutral" position. In the neutral position, the transmission does not engage any gear, and thus rotational drive is not transmitted to the transmission output shaft from the input of the engine.

The movement from an engaged position to a neutral position must occur while the gears are engaged. When the gears are engaged rotational drive is being transmitted from the engine to the transmission. The gears and collar actually transmitting rotational drive carry a high torque load, which makes it difficult if not impossible for an operator to manually move the collar out of engagement. This is a phenomena called "torque lock." To overcome torque lock, most modern vehicles are equipped with clutches. An operator is able to break the torque lock by actuating a clutch pedal, thus breaking the drive connection between the engine and the transmission. The operator is then able to easily move the gear out of engagement. Alternatively, the driver may be able to reduce torque sufficiently through the accelerator pedal, although this requires a good deal of experience.

In heavy vehicles, the clutching necessary to complete a shift between gears is relatively complicated. Typically, the driver must actuate or disengage the clutch and move the transmission to neutral. The clutch is then reengaged. The operator then modifies engine speed through the accelerator to synchronize the speed ratio to that necessary at the next gear. The operator must then manually move the gear shift lever to engage the gear in the proper new gear. Typically, an operator is not able to identically match the synchronization speed ratio, and must actuate the clutch to engage the new gear.

All of these steps make gear shifts complicated. This is particularly true when several shifts are to be made in quick succession. More recently, heavy vehicles have become equipped with controls and operator-intensive operations. Thus, it would be desirable to reduce the steps an operator must make on a routine basis when driving. To this end, it would be desirable to allow the operator to move the gear out of engagement for a shift without having to operate the clutch, synchronize the speed ratio and then reengage the transmission in the new gear, again without having to use the clutch.

The prior art has proposed systems to assist in eliminating the torque load on the vehicle when attempting to move the gear to neutral. Those systems have been somewhat impractical, and have not provided an operator the option of not using the torque elimination feature. A more experienced driver may wish to not use the torque elimination feature, but may sometimes choose to use the clutch, or use the accelerator to reduce engine power. A more experience driver may only be interested in using the torque elimination feature when several sequential shifts are to be made. Thus, the prior system which does not provide the operator the option of not using the torque elimination on a gear shift has deficiencies.

Moreover, the prior art does not allow the operator to provide an indication of the shift direction to the engine control. Since the prior art does not receive a signal from the driver to indicate whether an upshift or downshift is next occurring, the prior art must somehow predict which gear will be next when determining a synchronization speed. This is somewhat undesirable, and may not allow the system to operate as quickly as a system in which the operator provides an indication of the direction of the next expected gear shift.

SUMMARY OF THE INVENTION

In a disclosed embodiment of this invention, a vehicle drive comprises an engine having an electronic control unit. An engine output shaft drives a multi-speed transmission. An output shaft of the transmission powers the drive axles for the vehicle. A manual stick shift lever is provided, as are at least two driver inputs. The driver is able to provide an indication of when an upshift or a downshift is next expected, and also signal when torque elimination is desired to allow the operator to disengage the transmission and move to neutral without actuating the clutch.

In a preferred embodiment of this invention two separate switches are utilized such that the operator may separately indicate shift intent, without requesting torque elimination. An operator may shift by utilizing the clutch or accelerator to allow the transmission to be moved to neutral and then have the speed automatically synchronized.

In an alternative embodiment, a three position switch is utilized. The three positions include a no shift intent, no torque elimination position; an upshift with a request for the torque elimination position; and a downshift with a request for the torque elimination position.

The electronic control unit takes the indication of whether an upshift or downshift is next occurring, and calculates what the engine output speed should desirably be when the transmission is reengaged at the next gear ratio. The electronic control unit also is operable, upon a driver request, to change an engine parameter such as fueling to eliminate torque transmission between the engine and the transmission. The operator may manually move the transmission to neutral without clutching. Once the transmission is in neutral, the electronic control unit then begins to adjust the engine speed such that it will match the desired speed ratio at the next gear. If the engine is at the synchronization speed, the operator does not need to use the clutch to engage the new gear.

Since the operator is provided with the ability to indicate an upshift or downshift, speed synchronization happens more quickly than in the proposed prior art systems. Moreover, since the operator is given the ability to request torque elimination separately from the indication of the gear shift direction, the operator may either clutch or use the torque elimination feature as desired for the particular shift being made.

These and other features of the present invention can be best understood from the following specification and drawings, the following of which is a brief description.

DETAILED DESCRIPTION OF A PREFERRED EMBODIMENT

Figure 1A:
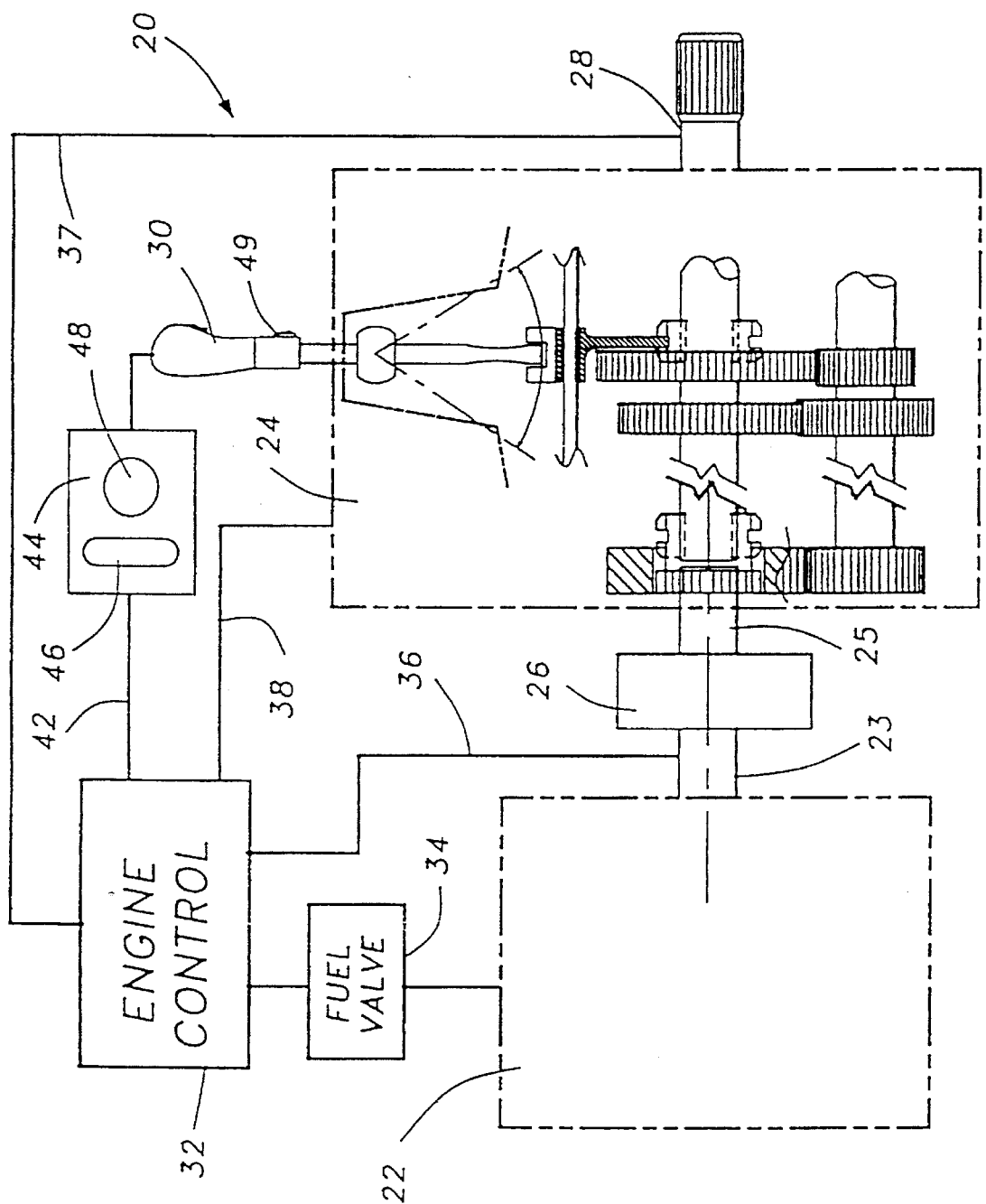
FIG. 1A is a schematic view of a vehicle drive according to the present invention.

FIG. 1A shows a vehicle drive 20 somewhat schematically. Engine 22 has an output shaft 23 that drives a multi-speed transmission 24 through an input shaft 25. A clutch 26 is disposed between the engine output shaft 23 and the transmission input shaft 25. The clutch is operated based upon an operator indication, such as depressing a clutch pedal.

A transmission output shaft 28 is driven by the input from the engine output shaft 23. The transmission 24 is operable to achieve several different speed ratios between the input on the engine output shaft 23 and the transmission output shaft 28. A manual stick shift 30 allows the operator to select between the several speed ratios, again as is known in the art.

An electronic control unit 32 is operable to control the engine output speed and torque on shaft 23, as by controlling the amount of fuel traveling to engine 22 through valve 34. Although a single control is illustrated, this invention extends to separate controls for the inventive subsystems. Other engine parameters may be controlled to vary engine speed and torque and may also come within the scope of this invention. The algorithms necessary for achieving desired fueling is known in the art. One acceptable electronic control unit is available from Detroit Diesel Corporation under Model No. DDEC III. The electronic control unit must be modified to achieve the additional functions as will now be disclosed.

ECU 32 receives input 36 of the actual output speed at the engine output shaft 23, the speed of the transmission output shaft 37, and an input 38 providing an indication of when transmission 24 is in neutral.

ECU 32 further receives a signal 42 from a operator control input console 44. The operator input console 44 includes a first switch 46 for providing an indication of whether an upshift or a downshift is expected as the next shift of the multi-speed transmission 24. Switch 46 may be a known type of switch having two positions. One position completes an electric contact, the other does not. The ECU interprets the ON and OFF signals as indicating whether an upshift or a downshift will be the next expected shift. Switch 46 remains in either of the two positions until moved by the operator. The console 44 also includes a switch 48 that allows the operator to request torque elimination between the engine and the transmission such that the operator will be able to move the transmission to neutral without actuating the clutch. In this embodiment, the console 44 is able to provide separate indications since two separate switches are utilized. The switch 48 is preferably of the sort which provides a signal when the driver depresses the button, but which returns to a nonactuated position once released. Thus, switch 48 preferably only sends a signal requesting torque actuation when moved by an operator to an actuated position. Although not clear from FIG. 1, the console 44 is preferably incorporated into the stick shift 30.

Figure 1B:
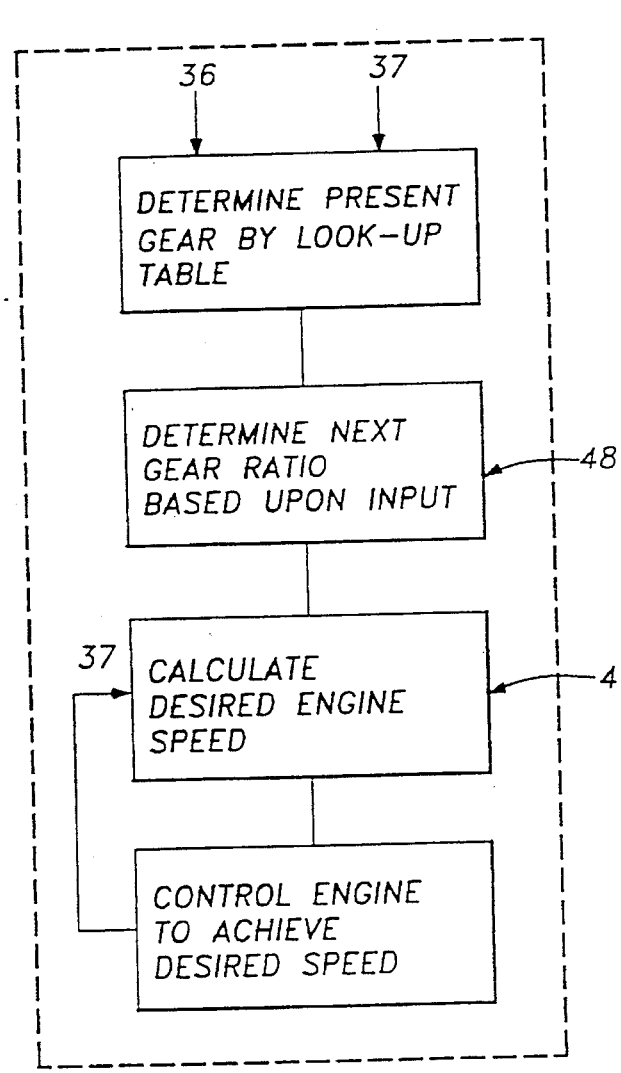
FIG. 1B is flow chart of a speed synchronization feature according to the present invention.

When operating the vehicle, an operator will make a determination that a gear shift is advisable. FIG. 1B shows a flow chart for a speed synchronization system. A presently engaged gear is determined by sensing engine and transmission speed and comparing this sensed ratio to ratios in a look-up table.

The operator may begin to manually move the stick shift and request torque elimination through switch 48. When switch 48 is depressed, ECU 32 moves the engine fueling to achieve reduced or eliminated torque load between the engine output shaft 23 and the transmission output shaft 28. The operator may then manually move the transmission to neutral without using the clutch. Since torque elimination through switch 48 is separate from shift indication through switch 46, the operator does have the option to utilize the clutch 26 on some shifts. Once the transmission is in neutral, ECU 32 moves engine speed to the desired speed. Also, a system ON/OFF switch 49 is preferably provided such that fully manual actuation of the clutch and synchronization of the speeds, as in the prior art, is available to an experienced operator who wishes to perform those functions.

An indication is provided through switch 46 to the electronic control unit 32 that either an upshift or a downshift will be the next expected shift. If a series of shifts are to be performed in relatively quick succession, the operator may well leave the switch 46 in the up or down position. The ECU determines what the next gear will be based upon the currently engaged gear and the signal indicating whether the next gear shift would be an upshift or a downshift. The ECU may then calculate a desired engine speed to achieve a synchronized speed ratio at the new gear based upon the present transmission output speed. The ECU repeats the determination periodically since transmission speed will change.

Figure 2A:
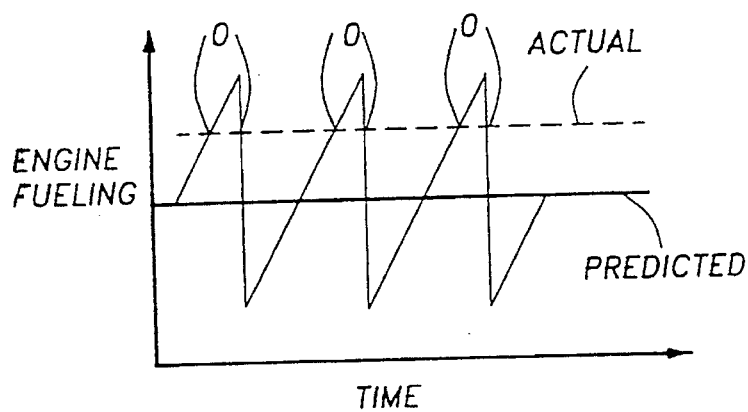
FIG. 2A is a graphical representation of a torque elimination feature according to the present invention.

FIG. 2A shows a graphic representation of how the torque elimination feature is achieved. First, the ECU 32 predicts zero torque engine fueling based on several factors. The several factors which are utilized to predict this fueling are disclosed in co-pending patent application Ser. No. 08/508,155, entitled "Method and Apparatus for Assisting and Shifting Transmission to Neutral." Although fueling is preferably controlled it may be possible to control other system parameters to achieve the zero torque load. ECU 32 moves the engine fueling above and below this predicted zero torque value as shown in FIG. 2A. Most preferably, a saw toothed profile of engine fueling is provided. This saw tooth profile repeatedly crosses an actual zero torque value. Since the operator is attempting to move the transmission to neutral during this adjustment, at each of the crossing points (labeled O in FIG. 2A), the operator is able to easily move the transmission to neutral. Based upon available electronic control units, this engine fueling modification happens very rapidly, and on the order of fractions of a second.

Figure 2B:
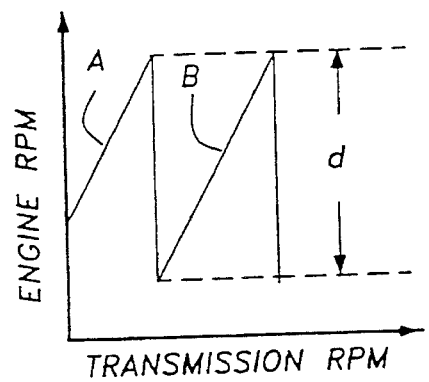
FIG. 2B is a graphic representation of why speed synchronization is required on a gear shift.

Once the transmission 24 is moved to neutral, a neutral signal is sent to ECU 32. ECU 32 then begins to synchronize the output speed ratio to approximate the desired speed ratio to be synchronized with the speed of transmission output shaft 28. As shown in FIG. 2B, when one is upshifting, one must reduce the engine speed to arrive at the synchronized speed ratio, since a much lower engine speed is required to achieve the same transmission output speed. On the other hand, when downshifting, one must move the engine speed higher to achieve the same transmission output speed at the next lower gear level. As shown in FIG. 2B, the gear B is a higher gear than gear A. If one were to downshift from gear B to A, one would have to increase the engine RPMs by the amount shown at d. On the other hand, should one wish to upshift from gear A to gear B, one would have to decrease the engine speed by that same amount.

Also, an operator can signal a skip shift or a shift through several gears by repeatedly actuating switch 48. As an example, if switch 46 indicates an upshift, and switch 48 is depressed and released three times, ECU 32 interprets a three-gear skip shift. The next gear ratio factors this skip shifting into the determination of the desired speed ratio.

Alternatively, the operator may wish to use the clutch to move to neutral, but then request speed synchronization. The FIG. 1 console 44 allows this option.

Figure 3:
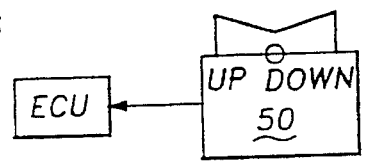
FIG. 3 Shows an alternative switching system according to the present invention.

FIG. 3 shows a second embodiment operator console 50. In embodiment 50, only a single switch is provided. The single switch is a three-position switch. The illustrated position is no shift intent, no torque elimination requested. The other two positions of switch 50 provides both a request for torque elimination and a shift intent of either up or downshifting. With this system, the operator must perform only one switch actuation, however, the operator is not able to separately request speed synchronization or torque elimination.

In most preferred embodiments of this system 20, a switch is provided for signal 38 that provides a positive indication of both neutral and gear engaged. Such a switch is disclosed is co-pending patent application Ser. No. 08/508,067, entitled "Two-Position Neutral Switch For Multi-Speed Transmissions." Further, it may be desirable to add additional vehicle speed decay on an upshift to rapidly decrease the engine output RPMs. Such a system is disclosed in co-pending patent application Ser. No. 08/508,111, which is entitled "Engine Speed Retardation System For Transmission Upshifts." The engine speed synchronization system as disclosed generally in this Application is more fully disclosed in co-pending patent application Ser. No. 08/508,135, which is entitled "Engine Speed Synchronization System for Assisting a Manual Transmission Shift." The torque features of the system 20 are generally disclosed in co-pending patent applications Ser. No. 08/508,153, entitled "Four-Position Switch for Shift Assist System;" Ser. No. 08/507, 996, entitled "Automatic Range Shift for Multi-Speed Transmission;" and Ser. No. 08/508,156, entitled "Combined System for Assisting Shifting of Manual Transmission Without Clutching." The above applications were all filed on the same day as this application.

Preferred embodiments of this invention have been disclosed, however, a worker of ordinary skill in the art would recognize that certain modifications will come within the scope of this invention. For that reason, the following claims should be studied to determine the true scope and content of this invention.

We claim:

1. A vehicle drive comprising:

an engine having an output shaft and an electronic control unit for controlling the output speed of said engine output shaft;

a multi-speed transmission, said multi-speed transmission being selectively connected to said engine output shaft and operable to convert drive from said engine output shaft through several speed ratios to an output speed on a transmission output shaft;

a clutch that may be selectively actuated by an operator, said clutch positioned between said engine and said transmission; and an input control for an operator, said input control allowing an operator to provide an indication to said electronic control unit of whether an upshift or a downshift is to be initiated, and further providing the operator the ability to request torque elimination during this shift, said electronic control unit being operable to receive signals from said input control, and determine a desired engine speed at the next gear ratio based upon said operator indication, and to control said engine to achieve said desired engine speed, and said electronic control unit further being operable to modify an engine parameter to achieve reduced torque transmission to said transmission to allow an operator to move said transmission to a neutral position when a signal requesting torque elimination is received from said input control.

2. A vehicle drive as recited in claim 1, wherein an operator is able to indicate upshift or downshift without requesting torque elimination.

3. A vehicle drive as recited in claim 2, wherein two separate switches are provided with a first shift intent switch being operable to provide an indication of whether an upshift or a downshift is requested, and a second torque elimination request switch being operable to request torque elimination.

4. A vehicle drive as recited in claim 2, wherein said shift intent switch remains in a position indicating an upshift or a downshift until the operator moves said switch back out of that position.

5. A vehicle drive as recited in claim 4, wherein said torque elimination request switch returns to an off position when released by the operator.

6. A vehicle drive as recited in claim 5, wherein an ON/OFF shift is also provided allowing an operator to enable or disable the speed synchronization and torque elimination system.

7. A vehicle drive as recited in claim 1, wherein said electronic control unit achieves torque elimination by predicting an engine parameter that results in a zero torque load from the engine through the transmission, and beginning to move the engine parameter to that predicted value when a request for torque elimination is received.

8. A vehicle drive as recited in claim 1, wherein a single switch having three positions is utilized to provide both the shift intent and the torque elimination request.

9. A method of operating a vehicle comprising the steps of:

a. providing a vehicle drive including an engine having an output shaft, an electronic control unit for controlling the speed of said engine output shaft, a multi-speed transmission selectably driven by said engine output shaft, said multi-speed transmission being operable to be moved between several speed ratios to control the ratio between an output speed on an output shaft of said transmission and the speed of said engine output shaft, a clutch disposed between said engine output shaft and said transmission to allow a elimination of drive from said engine to said transmission, and an operator input switch system allowing an operator to provide an indication to said electronic control unit of when an upshift or a downshift is to be expected as the next shift, and further providing the operator the ability to request torque elimination from said electronic control unit such that the transmission may be moved to neutral without actuating said clutch;

b. providing an indication to said electronic control unit of whether an upshift or a downshift is expected as the next gear shift;

c. identifying a desired engine speed at the next expected gear ratio based upon said driver input of whether an upshift or a downshift is next expected;

d. providing a torque elimination request from said operator switch;

e. controlling an engine parameter to reduce the torque load from said engine on said transmission;

f. manually moving said transmission to neutral;

g. using said electronic control unit to begin moving said engine output speed to said desired engine speed; and h. engaging said transmission in said next selected gear.

10. A method as recited in claim 9, wherein said operator switches allow an operator to provide an indication of whether an upshift or a downshift is next expected independent of a torque elimination request.

11. A method as recited in claim 10, wherein two separate switches are provided for shift intent and torque elimination request.

12. A method as recited in claim 10, wherein said switch system remains in a position indicating an upshift or a downshift until moved out of said position by an operator.

13. A method as recited in claim 12, wherein said switch system for requesting torque elimination returns from a non-actuated position once released by an operator.

14. A method as recited in claim 9, wherein a single three position switch is utilized, with one position being no shift intent, a second position being an upshift indicated and torque elimination requested, and the third position being a downshift indicated with torque elimination also requested.

15. A method as recited in claim 10, wherein said parameter is engine fueling, and said torque reduction of step e. includes a prediction of an expected zero torque engine fueling, and using said electronic control unit to begin moving said engine fueling to said expected zero torque fueling upon receiving a request for torque elimination from the operator.

16. A method as recited in claim 15, wherein said electronic control unit moves said engine fueling above and below said predicted zero torque fueling such that actual engine fueling periodically crosses the actual zero torque fueling valve.

17. A method as recited in claim 9, wherein said electronic control unit controls said engine even when no shift is occurring.

18. A method of operating a vehicle comprising the steps of:

a. providing a vehicle drive including an engine having an output shaft, an electronic control unit for controlling the engine, a multi-speed transmission selectably driven by said engine output shaft, said multi-speed transmission being operable to be moved between several speed ratios to control the ratio between an output speed on an output shaft of said transmission and the speed of said engine output shaft, a clutch disposed between said engine output shaft and said transmission to allow elimination of drive from said engine to said transmission, and an operator input switch system allowing an operator to provide an indication to said electronic control unit of when an upshift or a downshift is to be expected as the next shift, and further providing the operator the ability to request torque elimination from the electronic control unit such that the transmission may be moved to neutral without actuating said clutch, said operator input switch system allowing an indication of an upshift or a downshift independent of a request for torque elimination, and said operator input switch system further including an ON/OFF switch for disabling a speed synchronization system;

b. operating a vehicle and controlling said engine with said electronic control unit, and determining whether said ON/OFF switch has enabled a speed synchronization system;

c. providing a request for torque elimination from said switch system;

d. controlling an engine parameter to reduce the torque load from said engine on said transmission;

e. manually moving said transmission to neutral;

f. providing an indication to said electronic control unit of whether an upshift or a downshift is expected as the next gear shift through said switch system;

g. identifying a desired engine speed value at the next expected gear ratio based upon said indication of whether an upshift or a downshift is next expected;

h. using said electronic control unit to begin moving said engine output speed to said desired engine output speed; and i. engaging said transmission in said next selected gear.

19. A method as recited in claim 18, wherein an operator intent switch which provides said indication of step f. remains in a position indicating an upshift or a downshift until moved by an operator.

20. A method as recited in claim 17, wherein said operator manually moves a stick shift to move the transmission components in steps e. and i.

* * * * *

UNITED STATES PATENT AND TRADEMARK OFFICE
CERTIFICATE OF CORRECTION

PATENT NO. : 5,571,059
DATED : November 5, 1996
INVENTOR(S) : Desautels et al.

It is certified that error appears in the above-identified patent and that said Letters Patent is hereby corrected as shown below:

<u>Title page,</u>
Item [73], should read as follows:

-- [73]  Assignee:  Rockwell International Corporation
Pittsburg, PA

Detroit Diesel Corporation
Detroit, MI --

Signed and Sealed this

Second Day of April, 2002

*Attest:*

JAMES E. ROGAN
*Attesting Officer*    *Director of the United States Patent and Trademark Office*